Dec. 7, 1965     W. SEAMONE ETAL     3,221,501
POWER MATCHED HYDRAULIC SERVO-SYSTEM
Filed Aug. 19, 1964
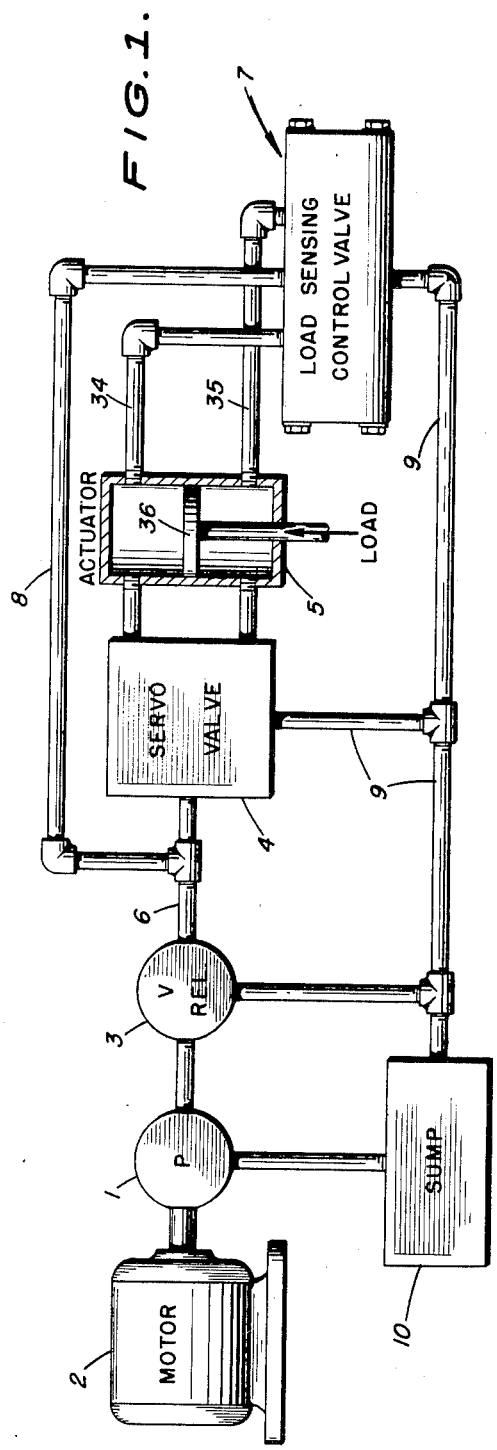
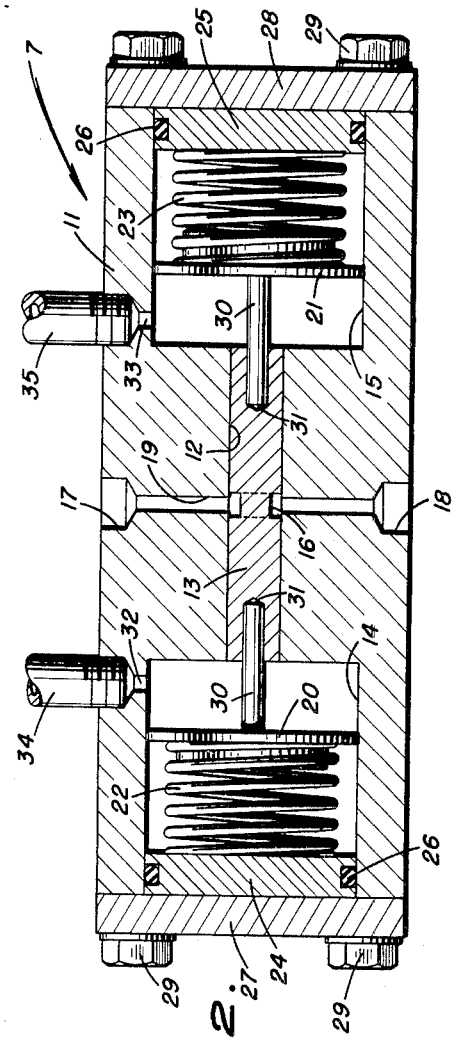
WOODROW SEAMONE
LORAN A. WENRICH
INVENTORS
BY
*Claude Funkhouser*
ATTORNEY

3,221,501
POWER MATCHED HYDRAULIC SERVO-SYSTEM

Woodrow Seamone, Rockville, and Loran A. Wenrich, Silver Spring, Md., assignors to the United States of America as represented by the Secretary of the Navy
Filed Aug. 19, 1964, Ser. No. 390,769
5 Claims. (Cl. 60—52)

This invention relates to an improved hydraulic servo-system, and more particularly to a servo-system in which minimum input power is achieved by means of a load sensed feedback loop.

In the prior art the need to minimize the input power requirements of a hydraulic system was not the acute problem it has now become. In modern technology, for example, each pound removed from the payload of a missile or satellite will reduce the ground weight and thrust requirements of its launch vehicle many times. One method of reducing this weight is to calculate the desired life of a missile or satellite and its power requirement during that life. Once the total power requirement is established the exact quantity, weight, and size of the energy source, such as batteries, may be determined. It therefore becomes desirable to reduce the power requirements of each component within the satellite or missile system.

In a hydraulic system much power is wasted since the motor and pump employed are operated at full capacity in order to be ready for immediate delivery of all the system's rated power. This method of operation represents a substantial waste of power due to the tendency of the system to operate at below maximum rating during much of its operational cycle.

It is therefore an object of this invention to provide a more efficient hydraulic servo-system so constructed as to be capable of conserving a considerable portion of power.

It is another object of the invention to provide, in a hydraulic servo-system, a variable load sensing control valve which is controlled by differential pressure and serves by means of a variable orifice to regulate fluid flow, thereby regulating the supply pressure.

A further object of this invention is to provide a conventional unitized servo/power package with a load feedback portion to control the output pressure of the pump.

Other objects and many of the attendant advantages of this invention will be appreciated as the same becomes better understood by reference to the following detailed description when considered in connection with the accompanying drawings, wherein:

FIG. 1 is a schematic of the improved hydraulic servo-system, showing the relationship of the system components; and FIG. 2 is an enlarged longitudinal section of the variable load sensing control valve.

According to the invention, a variable load sensing control valve has been placed in a conventional unitized servo/power package between the actuator and pump to provide a variable bypass leakage between the pressure and return portions of the system. Since the system operates at approximately constant r.p.m. and has a fixed displacement pump, the supply pressure will vary inversely as a function of the bypass leakage, i.e., as the leakage decreases the pressure will increase. The system of the present invention can be called a "power matched" system, power matching, as used here, being the matching of the output pressures of the pump with the actual pressure requirements of the servo-valve.

In operation, the load sensing control valve allows a small percentage of the hydraulic fluid to bypass the system's servo-valve and actuator and leak back into the sump. The leakage prevents the hydraulic pressure from building up beyond a fixed point as long as there is no load placed upon the system's actuator. During this stage of operation the system's pump and motor displace a fixed amount of hydraulic fluid but at a reduced pressure and, consequently, at a reduced power requirement. The actuator is kept under a continuous dithering motion by the servo-valve and the major portion of the hydraulic fluid passes therethrough. When a load is placed upon the actuator, thereby creating a pressure differential across it, the pressure differential is sensed by the load sensing control valve which is closed to an extent in proportion to the pressure differential, thereby proportionally increasing the pressure delivered from the hydraulic pump and motor. The proportionate pressure increase is brought about by the combined feature of a fixed displacement of hydraulic fluid and the elimination of the leakage path around the actuator, thereby causing a rapid pressure increase in the incompressible hydraulic fluid. As this leakage path is closed the hydraulic pump and motor begin to deliver their maximum pressure to the actuator and the motor drains maximum power from its energy source for the first time.

Referring now to the drawings, a fixed displacement hydraulic pump 1 is driven at a constant r.p.m. by a motor 2. A relief valve 3 is set at any desired limit. A servo-valve 4 is controlled by an input signal and in turn controls the actuator 5 which is connected with a load. The pump, relief valve and servo-valve are all connected by a high pressure line 6. Reference may be made to U.S. Patent 2,835,265 of Brandstadter for an example of an actuator and servo-valve arrangement. The variable load sensing control valve 7 of the present invention is controlled by the actuator 5 so that under no-load conditions i.e., when no signal is received by the actuator and no external load is applied, a variable orifice in the valve 7 will be open. This orifice will partially bypass the pressure line 6 around the servo-valve through a line 8, venting it to a return line 9, thereby reducing the required system pressure. This pressure reduction lessens the power required by the motor and results in a conservation of energy. A sump 10 acts as a reservoir for recirculation of hydraulic fluid.

A variable load sensing control valve is shown in FIG. 2. The control valve is comprised of a housing 11 rectangular in shape and bored to define a relatively small diameter open ended cylinder 12, which slidably receives a piston 13, and relatively large cylindrical chambers 14 and 15. The piston 13 has an annular groove 16 about its center portion. When the piston 13 is in its no-load position, the groove 16 connects a pressure port 17 with a return port 18 through an orifice 19, thereby allowing a partial bypass around the servo-valve which reduces the system pressure. Under no-load conditions, the piston 13 is maintained in its no-load position by plungers 20 and 21, slidably contained in the chambers 14 and 15, respectively, and acting in opposite directions on the piston 13 under the influence of springs 22 and 23, respectively. The springs are confined within the chambers 14 and 15 between closure plugs 24 and 25, which close the outer ends of said chambers, and the outer faces of the plungers. Each plug is sealed by a gasket 26, and the plugs are held in their respective chambers by end plates 27 and 28, each secured to the housing 11 by a plurality of bolts 29. As best seen in FIG. 2, the plungers 20 and 21 are each provided with a centering stem 30 which has its free end fitted in a recess 31 in each end of the piston 13.

The piston 13 is displaced from its no-load position as a result of a pressure differential between ports 32 and 33. connected between the actuator and the valve 7 by pressure lines 34 and 35 (FIG. 1). This differential is generated by the actuator's piston 36 being displaced from a no-load position by either the action of the servo-valve or by an external load. The resulting motion of the piston 13 will serve to restrict and ultimately close the orifice 19 between the pressure port 17 and the return port 18, thereby permitting pressure in the system to increase.

The combination of the piston 13, its groove 16, the pressure port 17, and the return port 18 form the control portion of the variable load sensing control valve; while the load sensing portion is comprised of the chambers 14 and 15, the plungers 20 and 21, the ports 32 and 33, their lines 34 and 35, and the piston 13.

From the foregoing description and from an examination of the drawings, it will be obvious that the pressure in the system will be under the control of the variable load sensing control valve 7. This device acts as a load responsive feedback control means which correlates the pump output pressure with the actual system requirements.

Obviously, many modifications and variations of the present invention are possible in the light of the above teachings. It is therefore to be understood that within the scope of the appended claims the invention may be practiced otherwise than as specifically described.

What is claimed is:

1. A hydraulic servo system, comprising
   a pump,
   a relief valve connected with the pump,
   a servo-valve having an input connected with the relief valve,
   actuator means connected to the servo-valve and having a piston for connection to a load,
   sump means connected to said valves and said pump, and
   a variable load sensing control valve including means connected between the servo-valve input and the sump for bypassing said servo-valve and actuator means, said variable load sensing control valve also including mechanical means connected to the actuator means and operable to mechanically vary the bypass around said servo-valve and actuator means inversely with the load.

2. A hydraulic servo system, comprising
   a pump,
   a relief valve connected with the pump,
   a servo-valve having an input connected with the relief valve,
   an actuator connected to the servo-valve and having a piston for connection to a load,
   a sump connected to said valves and said pump, and
   a mechanical variable load sensing control valve mechanically connected between the servo-valve input and the sump and connected with the actuator, said variable load sensing control valve bypassing hydraulic fluid flow around said actuator and servo-valve under no-load conditions and mechanically sensing under load conditions a fluid pressure differential across the actuator piston for varying fluid flow, by directly and mechanically bypassing fluid to the sump in inverse proportion to the load.

3. A hydraulic servo system as recited in claim 2, wherein the variable load sensing control valve comprises,
   a housing having a cylinder therein,
   a piston slidably mounted within said cylinder and having an annular groove disposed about its central portion, said piston being normally disposed in a no-load position,
   said housing having pressure and return ports and an orifice connecting said ports to said cylinder and communicating with said annular groove when the piston is in a no-load position,
   said housing having chambers communicating with said cylinder,
   spring urged plungers slidably mounted in the chambers and connected with each end of said piston, and
   said housing having pressure ports communicating with the chambers through which ports hydraulic fluid under pressure passes to displace said piston from its no-load position to vary the connection between said pressure and return ports upon displacement of the actuator piston due to the impression of a load.

4. A hydraulic servo system, comprising
   a constant r.p.m. motor and a fixed displacement pump for a moving a hydraulic fluid,
   a relief valve connected with the pump,
   a servo-valve having an input connected with the relief valve, through which a major portion of the hydraulic fluid passes,
   an actuator connected to the servo-valve and having a piston for connection to a load,
   a load sensing control valve connected to the actuator,
   a sump,
   means connecting the pump and the valves to the sump, and
   bypass means directly and mechanically connecting the servo-valve input to the load sensing control valve and passing a portion of hydraulic fluid around the actuator and servo-valve to the load sensing control valve under no-load conditions,
   said load sensing control valve including a control means having a variable orifice connected to the bypass means and load sensing means connected with each side of the actuator piston, the demands of a load on the actuator piston being communicated through the load sensing means to the control means for reducing fluid flow through said orifice and said bypass as the load increases.

5. A hydraulic servo-system, including
   a pump,
   a relief valve connected to the pump,
   a servo-valve having an input connected with the relief valve,
   an actuator connected to the servo-valve and having a piston for connection to a load,
   a sump connected to said valves and said pump,
   a mechanical variable load sensing control valve connected between the servo-valve input and the sump, and comprising
   a housing having a cylinder therein,
   a piston slidably mounted within said cylinder and having an annular groove disposed about its central portion, said piston being normally disposed in a no-load position,
   said housing having pressure and return ports and an orifice connecting said ports to said cylinder and communicating with said annular groove when the piston is in a no-load position,
   said housing having chambers communicating with said cylinder,
   spring urged plungers slidably mounted in the chambers and connected with each end of said piston, and said housing having pressure ports communicating with the chambers through which ports hydraulic fluid under pressure passes to displace said piston from its no-load position to vary the connection between said pressure and return ports upon displacement of the actuator piston due to the impression of a load.

References Cited by the Examiner

UNITED STATES PATENTS 3,125,856   3/1964   Branson et al. ———————— 60—52

SAMUEL LEVINE, *Primary Examiner.*

EDGAR W. GEOGHEGAN, *Examiner.*